(No Model.)

H. C. DICKINSON.
DIE.

No. 479,354. Patented July 19, 1892.

Witnesses:
J. D. Garfield
H. Bellows

Inventor:
H. C. Dickinson
by
Chapin &
Attys.

UNITED STATES PATENT OFFICE.

HENRY C. DICKINSON, OF SPRINGFIELD, MASSACHUSETTS, ASSIGNOR TO THE SPRINGFIELD SPECIALTY MANUFACTURING COMPANY, OF SAME PLACE.

DIE.

SPECIFICATION forming part of Letters Patent No. 479,354, dated July 19, 1892.

Application filed October 5, 1891. Serial No. 407,819. (No model.)

*To all whom it may concern:*

Be it known that I, HENRY C. DICKINSON, a citizen of the United States, residing at Springfield, in the county of Hampden and State of Massachusetts, have invented new and useful Improvements in Dies, of which the following is a specification.

This invention relates to means for the production of hollow metallic studs which are provided with tops or heads that are in part formed from plastic material and which studs are filled as to an upper portion of their internal space with the plastic material.

The invention consists in the particular construction and combination of parts to constitute a die mechanism for use in the production of the studs having plastic heads, all substantially as will hereinafter fully appear, and be set forth in the claims.

Figure 1:
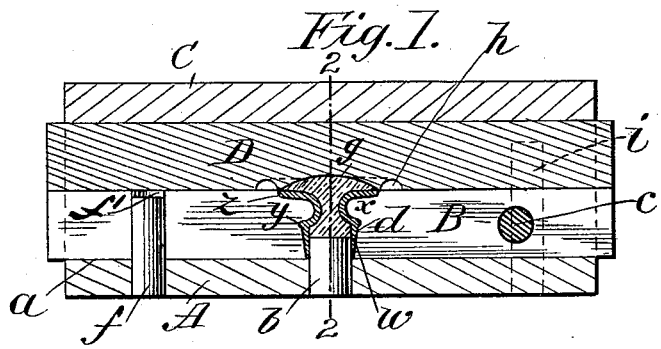
Figure 2:
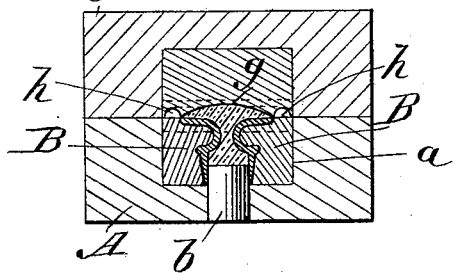
Figure 3:
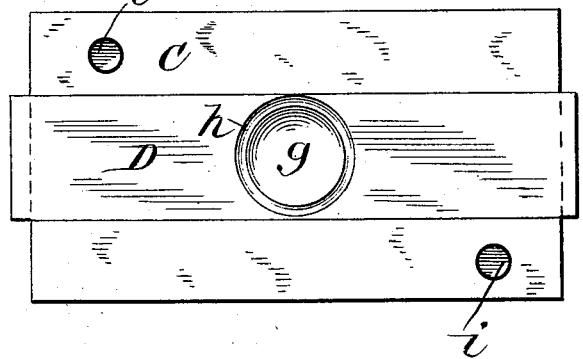
Figure 4:
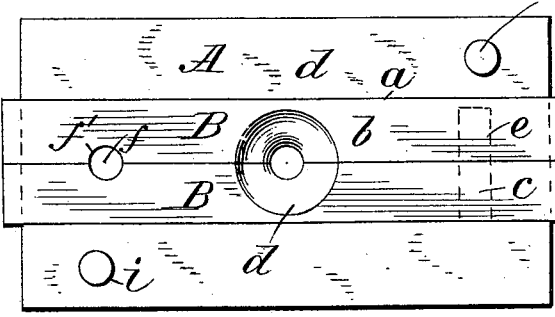

Referring to the accompanying drawings, Figure 1 is a longitudinal sectional view of the set of dies shown as in their operative relations and effecting the formation of the top of plastic material and the engagement thereof with the metallic portion of the stud. Fig. 2 is a cross-section of the same, taken on line 2 2, Fig. 1. Fig. 3 is a bottom plan view of the upper die. Fig. 4 is a plan view of the lower die-sections.

The method of forming and securing the engagement of the head, which is of plastic material—such as the composition from which black or other buttons are formed—upon a hollow and tubular metallic stud by the employment of the present improved form of die mechanism consists in supporting the stud and providing a pin or stopper to enter the lower portion thereof, inclosing the stud between blocks which have depressions therein to fit and reinforce the body of the stud, and then applying a quantity of plastic material at the top of the stud, die-pressing the same into the the upper portion which is above and unfilled by the stopper, and molding the top.

In the drawings, A represents a metallic base-plate or supporting-block having therein a channel $a$, and a pin or stud $b$ is set in the bottom of the said plate to project a short distance above the bottom surface of the said channel.

B B represent removable and separable die members or blocks, each of which has a die depression $d$ therein, which conforms to the external shape of the stud, which may be more or less variable, but which as here shown embodies the shank $w$ and the neck $x$ thereabove, there being the annular rib $y$ between the shank and neck, and above the neck the tubular stud is widened, being integrally formed as a circular flaring ledge or flange $z$, which in part forms and which otherwise supports a part of the head of the stud. The said die members B B have the inner engaging-stud $c$ and socket $e$, whereby when matched the die depressions $d$ $d$ will come together, and there is another pin $f$, which is set in the bottom of the plate A, projecting within the said channel $a$, which enters the opening $f'$ therefor in the proximate faces of the dies B B and determines the position of said dies upon the support A.

D represents the upper die member or block, which has therein the shallow circular depression $g$, which corresponds to the rounded or convex shape to be given to the top of the stud which is to be formed by the plastic material, and surrounding same is the annular depression $h$ for clearance of surplus stock. The block or plate C, which carries the hardened die-block D, is caused to properly match and engage with the other plate by sockets and dowels, as indicated at $i$.

It will be seen that the stud or shell which is embraced by the die members is fully supported throughout its surface by said die members. Thus no matter how great the pressure short of a bursting strain on the dies the metallic stud will not be distorted. The dies are supported against side expansion by the wall of the base-plate.

The hollow metallic stud or annular shell having been embraced between the die members B B and the latter set into the channel $a$ of the die-plate A, the pin $b$ entering and filling the lower portion of the hollow stud, and while the upper die member is removed or separated a quantity of the plastic material approximately or slightly exceeding that necessary to be embodied in the stud is placed at the top of the stud, and then the upper die on being forced to place forces the plastic material down into and beyond the throat or contracted opening in the stud and below such contracted opening against the upper end of the pin $b$ and forms the upper surface of the top rounded and smooth. At the time of the compression and molding the dies B B reinforce the stud-shell and prevent any distortion or rupture of the same as the molding and considerable compression takes place. This operation having been accomplished and the under die raised, the die members or blocks B B are lifted from the supporting-plate and pin and separated, leaving the completely-formed stud to be disposed of as desired and permitted to harden as to the portion thereof which is formed by the plastic material.

What I claim, and desire to secure by Letters Patent, is—

1. The metallic base-plate having a channel therein and a pin entering said channel, the removable die members B B, resting directly in said channel and having depressions in line with said pin and conforming to the shape of the stud which is covered and supported by said die members, the die member D, having a depression therein opposite the recess in the die members B B, and the block C, embracing and inclosing said die member D and having means for causing said die members to register, all combined substantially as described.

2. The base die-block having the channel therein and the pin supported at an intermediate part of the base of the channel and extending upwardly into the channel, the separable and removable die members B B, constructed to rest in the channel and having matching depressions in their adjacent faces in line with the pin and conforming to the exterior of the metallic stud, and the upper die-block with the depression conforming to the desired shape of the molded article, with means for guiding said die members in a direct line, all combined substantially as described.

HENRY C. DICKINSON.

Witnesses:
E. H. LATHROP,
WM. S. BELLOWS.